US011995957B2

(12) United States Patent
Jairath et al.

(10) Patent No.: US 11,995,957 B2
(45) Date of Patent: May 28, 2024

(54) SYSTEM AND METHOD OF PROVIDING A HOLD-AND-SPIN GAME WITH CONFIGURABLE SYMBOL SPLITTING

(71) Applicant: Aristocrat Technologies Australia Pty Limited, North Ryde (AU)

(72) Inventors: Gaurav Jairath, New Delhi (IN); Amresh Singh, Greater Noida (IN); Vinu Nair, Bengaluru (IN)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 48 days.

(21) Appl. No.: 17/709,117

(22) Filed: Mar. 30, 2022

(65) Prior Publication Data

US 2023/0094183 A1 Mar. 30, 2023

(30) Foreign Application Priority Data

Sep. 30, 2021 (IN) ............................. 202141044425

(51) Int. Cl.
*G07F 17/32* (2006.01)

(52) U.S. Cl.
CPC ...... *G07F 17/3265* (2013.01); *G07F 17/3213* (2013.01); *G07F 17/3267* (2013.01)

(58) Field of Classification Search
CPC .. G07F 17/32; G07F 17/3213; G07F 17/3227; G07F 17/323; G07F 17/3244; G07F 17/326; G07F 17/3265; G07F 17/3267; G07F 17/34
See application file for complete search history.

(56) References Cited

U.S. PATENT DOCUMENTS

| | | | | |
|---|---|---|---|---|
| 11,270,552 | B1 * | 3/2022 | Delekta | G06F 7/588 |
| 2005/0148384 | A1 * | 7/2005 | Marks | G07F 17/3244 463/20 |
| 2008/0113739 | A1 * | 5/2008 | Visser | G07F 17/34 463/20 |
| 2008/0139294 | A1 * | 6/2008 | Inamura | G07F 17/3202 463/20 |
| 2008/0167115 | A1 * | 7/2008 | Singer | G07F 17/3286 463/20 |
| 2016/0093141 | A1 * | 3/2016 | Nelson | G07F 17/326 463/20 |
| 2020/0005600 | A1 * | 1/2020 | Marks | G07F 17/3244 |
| 2020/0302754 | A1 * | 9/2020 | Fong | G07F 17/3213 |
| 2021/0082248 | A1 * | 3/2021 | Guerrero | G07F 17/3267 |
| 2021/0241572 | A1 * | 8/2021 | Marks | G07F 17/3213 |
| 2022/0301522 | A1 * | 9/2022 | Elmqvist | G06F 3/14 |
| 2022/0351579 | A1 * | 11/2022 | Davis | G07F 17/3213 |
| 2023/0122122 | A1 * | 4/2023 | Sidoti | G07F 17/3213 463/20 |

* cited by examiner

*Primary Examiner* — Milap Shah
(74) *Attorney, Agent, or Firm* — McAndrews, Held & Malloy, Ltd.

(57) ABSTRACT

A gaming machine provides a spinning reel game having a base game, from which a hold-and-spin game is triggered when a determined quantity of configurable symbols are displayed in a base game outcome. For each spin of the feature game, spin tags of configurable symbols are updated. When the spin tags have a predetermined relationship to a threshold value, the associated configurable symbol is split into a group of symbols. A feature game award is presented based on values associated with each configurable symbol in the feature game outcome.

20 Claims, 10 Drawing Sheets

700
710A 710B 710C 710D 710E
730
| Stop # | Reel 1 | Reel 2 | Reel 3 | Reel 4 | Reel 5 |
|---|---|---|---|---|---|
| 19 | | | C | | |
| 18 | | | C | | |
| 17 | | | B | | |
| 16 | A | | A | | |
| 15 | D | | G | | |
| 14 | E | A | F | | |
| 13 | F | C | D | | D |
| 12 | C | B | E | | B |
| 11 | D | A | C | D | C |
| 10 | B | E | D | D | A |
| 9 | C | D | A | C | B |
| 8 | A | C | B | B | D |
| 7 | B | A | B | D | E |
| 6 | A | B | C | C | F |
| 5 | A | A | B | D | A |
| 4 | B | B | C | A | B |
| 3 | A | C | C | B | D |
| 2 | C | A | A | E | E |
| 1 | B | B | C | E | C |
| 0 | B | B | A | D | E |
*FIG. 7*
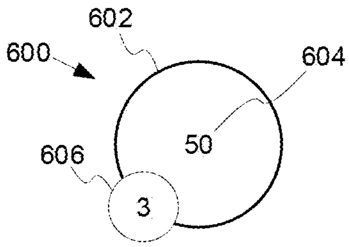
*FIG. 8A*
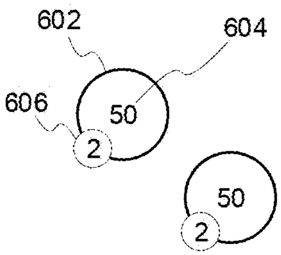
*FIG. 8B*
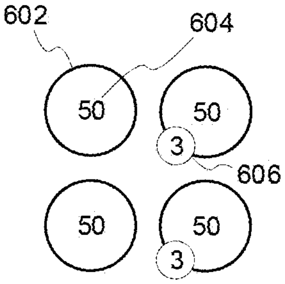
*FIG. 8c*

SYSTEM AND METHOD OF PROVIDING A HOLD-AND-SPIN GAME WITH CONFIGURABLE SYMBOL SPLITTING

RELATED APPLICATIONS

This application claims priority to Indian Application No. 202141044425, filed on Sep. 30, 2021, the disclosure of which is hereby incorporated herein by reference in its entirety.

BACKGROUND

Electronic gaming machines or gaming machines provide a variety of wagering games such as slot games, video poker games, video blackjack games, roulette games, video bingo games, keno games that are frequently offered at casinos and other locations. Play on gaming machines typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific symbol combinations along predetermined paths (or paylines) through the matrix indicate the outcome of the game. The display typically highlights winning combinations/outcomes for ready identification by the player. Specific symbol combinations and their corresponding awards are usually shown in a "pay-table" which is available to the player for reference. Often, the player may vary his/her wager to include differing quantities of paylines and/or the amount bet on each line. By varying the wager, the player may sometimes alter the frequency or quantity of winning symbol combinations, frequency or quantity of secondary games, and/or the amount awarded.

Typical wagering games use a random number generator (RNG) to randomly determine the outcome of each game. The wagering game is designed to return a certain percentage of the amount wagered back to the player (i.e., return-to-player) over the course of many plays or instances of the game. The return-to-player and randomness of the RNG ensure the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines is heavily dependent on the perceived entertainment value of the provided gaming experience. Operators of gaming businesses therefore demand the most entertaining, engaging, and exciting gaming machines so as to attract and retain patrons. To satisfy such demand, game developers are continuously inventing new gaming features. However, it is not enough for a new gaming feature to be entertaining, engaging, and exciting, the new gaming feature must also be realizable in a manner that satisfies regulatory requirements and that can be cost-efficiently manufactured. As such, game developers must not only satisfy the entertainment side of creating a new gaming feature, but must also address the technical side. In particular, game developers must identify technical problems associated with implementing the new feature and create technical solutions in order to bring their creation to market. Thus, there is a not only continuing need for new gaming features that are entertaining but also a continuing need for the technical solutions needed to bring such gaming features to market.

SUMMARY

Embodiments provide a gaming machine, a method, and gaming system with a spinning reel game having a base game, from which a hold-and-spin game is triggered when a determined quantity of configurable symbols are displayed in a base game outcome. During the feature game, a spin tag of a held configurable symbol is updated (e.g., decremented) after each spin. When the associated count reaches or passes a threshold (e.g., zero), the configurable symbol is split into multiple configurable symbols. Upon completion of the feature game, a feature game award is presented based on prizes of each configurable symbol including prizes of the multiple configurable symbols obtained via a split of a configurable symbol.

BRIEF DESCRIPTION OF THE DRAWINGS

Features and advantages of certain embodiments of the present disclosure will become apparent from the following description of embodiments thereof, by way of example only, with reference to the accompanying drawings, in which;

FIG. 7 depicts exemplary reel strips carried by the reels of the gaming machines shown in FIG. 1.

FIG. 8A depicts an example configurable symbol with a spin tag, which may be carried by the reels of the gaming machines shown in FIG. 1.

FIG. 8B depicts an example group of configurable symbols with spin tags, which may be formed by splitting the configurable symbol of FIG. 8A by a split factor of two.

FIG. 8C depicts another example group of configurable symbols with spin tags, which may be formed by splitting the configurable symbol of FIG. 8A by a split factor of four or by splitting the configurable symbols in the group of configurable symbols of FIG. 8B by a split factor of two.

Figure 1:
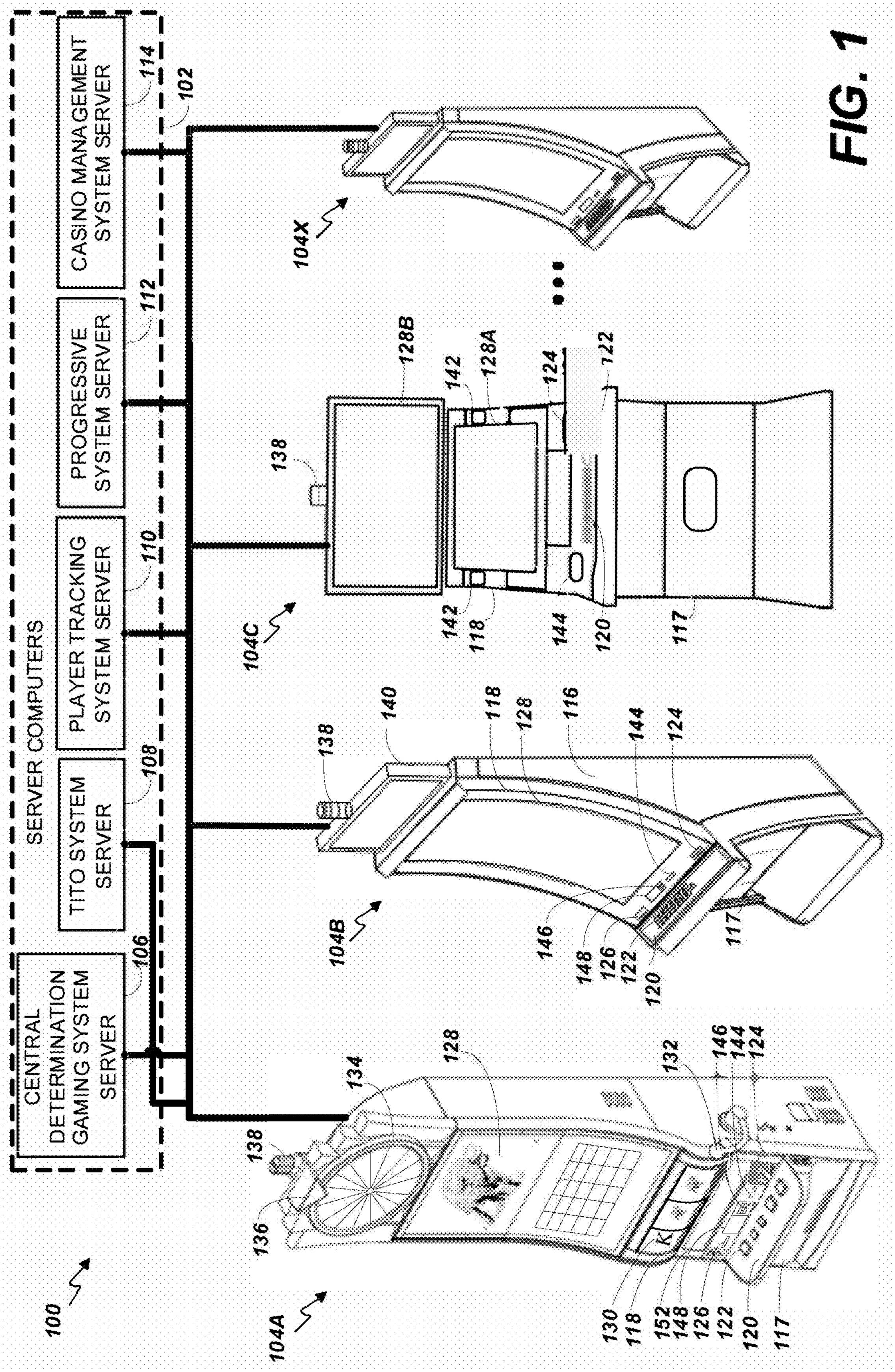
FIG. 1 is an example diagram showing several gaming machines networked with various gaming-related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present invention is not limited to the arrangements and instrumentality shown in the attached drawings.

DETAILED DESCRIPTION

The present disclosure is generally directed to solving various technical problems associated with gaming machines, which present a potentially large range of different symbols. In some embodiments, a gaming machine may achieve the large range of different symbols through the use configurable symbols that have a common component and a variable component. In some embodiments, reel strips may be populated with configurable symbols to which a range of indicias may be assigned. In this manner, a configurable symbol at a single reel strip position may effectively present a range of symbols via the assignment of indicia as the variable component.

The spin tags of the present disclosure would further exacerbate the issue if a conventional reel strip approach were used. As explained in greater detail below, spin tags may be selectively assigned to the configurable symbols. To accommodate all possible assignments of spin tags to the configurable symbols, a conventional reel strip approach would require extremely long reel strip lengths to accommodate all possible configurable symbol indicia and spin tag combinations. Embodiments of the present disclosure may independently assign indicia and spin tags to the configurable symbols. Thus, a single configurable symbol of a reel strip may effectively represent any indicia and/or spin tag combination. In this manner, the spin tags may be implemented without requiring reel strips of exceeding long lengths and may reduce memory requirements of the gaming machines. Moreover, such an implementation may enable the game designers to more readily maintain a desired return-to-player as they need to manage reel strips of reasonable lengths.

Furthermore, the spin tags increase player excitement as players anticipate the splitting of configurable symbols and the enhanced awards such splitting brings. While such spin tags may improve the emotional side of the gaming experience, the spin tags also improve the technical side of the gaming experience. Such tagging of configurable symbols provides a graphically efficient manner of conveying when each tagged symbol will split. A game machine may present many configurable symbols (e.g., five, ten, fifteen, etc.) at a given time. The gaming machine may easily track each configurable symbol and a respective number of remaining spins remaining for each configurable symbol before it splits. Such information, however, would be very difficult for a player of the gaming machine to accurately track for each of the displayed configurable symbols. By tagging each configurable symbol with a spin tag, the number of remaining spins required for the configurable symbol is quickly and efficiently conveyed to the player. As such, the symbol tagging of the present disclosure provides a technical improvement to convention graphical displays for gaming machines through their ability to convey additional information regarding respectively tagged symbols.

FIG. 1 illustrates several different models of gaming machines which may be networked to various gaming related servers. Shown is a system 100 in a gaming environment including one or more server computers 102 (e.g., slot servers of a casino) that are in communication, via a communications network, with one or more gaming machines 104A-104X (e.g., slot machines, video poker machines, bingo machines, etc.) that can implement one or more aspects of the present disclosure. In addition to gaming machines 104A-104X, the system 100 may include further gaming machines such as portable gaming machines and/or remote gaming machines. Such gaming machines may include, but are not limited to, smart phones, tablets, laptops, and game consoles. Although such gaming machines may require specialized software and/or hardware to comply with regulatory requirements regarding gaming machines used for wagering or games of chance in which monetary awards are provided. As such, such gaming machines may not be suitable for all embodiments disclosed herein.

Communication between the gaming machines 104A-104X and the server computers 102, and among the gaming machines 104A-104X, may be direct or indirect using one or more communication protocols. As an example, gaming machines 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming machines 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming machines such as gaming machine 104A, gaming machine 104B or any of the other gaming machines 104C-104X can implement one or more aspects of the present disclosure. However, it is typical to find multiple gaming machines connected to networks implemented with one or more of the server computers 102 described herein.

Moreover, in some implementations, at least some of the gaming machines may be "thin-client" or "thick-client" gaming machines that are not configured for stand-alone determination of game outcomes, etc. Such client gaming machines may be configured for communication with one or more of the different server computers 102 described herein, including but not limited to the central determination gaming system server 106. Some such client gaming machines may, for example, be configured to accept tickets and/or cash (e.g., via a bill validator that also functions as a ticket reader) to load credits onto the client gaming machine, a "ticket-out" printer for outputting a credit ticket when a cash out button of a player interface is pressed, a player tracking card reader, etc. Some client gaming machines may include a transceiver for wireless communication with a player's mobile device, (e.g., for communication with a player's smartphone, tablet and/or mobile gaming machine) a keypad 146, and/or an illuminated display 148 for reading, receiving, entering, and/or displaying player tracking information. A client gaming machines may include a display system, an audio system, etc., for presenting attract sequences, game presentations, etc. The game presentations may include game outcomes determined by another device, such as the central determination gaming system server 106.

The server computers 102 also may include a ticket-in-ticket-out (TITO) system server 108, a player tracking system server 110, a progressive system server 112, and/or a casino management system server 114. Gaming machines 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming machines 104A-104X that utilize the game outcomes and display the results to the players.

Gaming machine 104A is often of a cabinet construction which may be aligned in rows or banks of similar devices for placement and operation on a casino floor. The gaming machine 104A often includes a main door 117 which provides access to the interior of the cabinet. Gaming machine 104A typically includes a player interface, an access channel for a bill validator 124, and/or an access channel for a ticket printer 126. The player interface may include a button area or button deck 120 accessible by a player that includes input switches or buttons 122.

In FIG. 1, gaming machine 104A is shown as a Relm XL™ model gaming machine manufactured by Aristocrat® Technologies, Inc. As shown, gaming machine 104A is a reel machine having a gaming display area 118 comprising a quantity (typically 3 or 5) of mechanical reels 130 with various symbols displayed on them. The reels 130 are independently spun and stopped to show a set of symbols within the gaming display area 127 which may be used to determine an outcome to the game.

In many configurations, the gaming machine 104A may have a main display 128 (e.g., video display monitor) mounted to, or above, the gaming display area 127. The main display 128 can be, e.g., a high-resolution LCD, plasma, LED, or OLED panel which may be flat or curved as shown, a cathode ray tube, or other conventional electronically controlled video monitor. The main display 128 may be of one or more various orientations (i.e., landscape or portrait), aspect ratios and resolutions. In some implementations, the main display 128 may include a touchscreen.

In some embodiments, the bill validator 124 may also function as a "ticket-in" reader that allows the player to use a casino-issued credit ticket to load credits onto the gaming machine 104A (e.g., in a cashless ticket ("TITO") system). In such cashless embodiments, the gaming machine 104A may also include a "ticket-out" printer 126 for outputting a credit ticket when a "cash out" button of a player interface is pressed. Cashless TITO systems may be used to generate and track unique bar-codes or other indicators printed on tickets to allow players to avoid the use of bills and coins by loading credits using a ticket reader and cashing out credits using a ticket-out printer 126 on the gaming machine 104A. The gaming machine 104A may have hardware meters for purposes including ensuring regulatory compliance and monitoring the player credit balance. In addition, there can be additional meters that record the total amount of money wagered on the gaming machine, total amount of money deposited, total amount of money withdrawn, and total amount of winnings on gaming machine 104A.

In some embodiments, a player tracking card reader 144, a transceiver for wireless communication with a player's smartphone, a keypad 146, and/or an illuminated display 148 for reading, receiving, entering, and/or displaying player tracking information is provided in the gaming machines 104A. In such embodiments, a game controller (not shown in FIG. 1) within the gaming machines 104A can communicate with the player tracking system server 110 to send and receive player tracking information.

Gaming machines 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming machine 104A and may be activated by a player (e.g., using a switch or one of buttons 122 of a player interface) to indicate to operations staff that gaming machine 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming machines 104A have traditionally also included a handle 132 typically mounted to the side of main cabinet 116 which may be used to initiate game play.

Figure 2A:
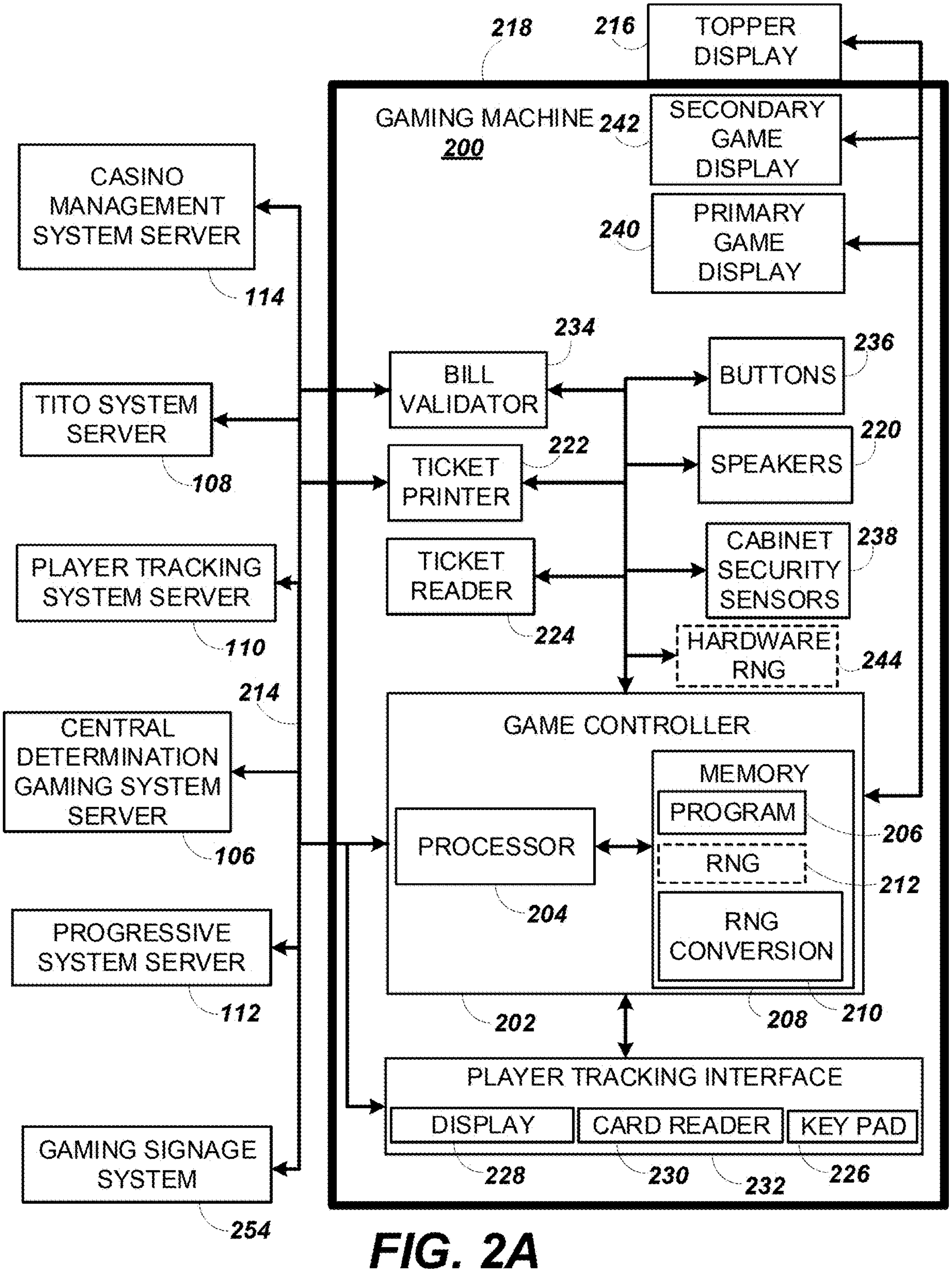
FIG. 2A is a block diagram showing various functional elements of an example gaming machine.

Many or all of the above-described components can be controlled by circuitry (e.g., a gaming controller) housed inside the main cabinet 116 of the gaming machine 104A, the details of which are shown in FIG. 2A.

Note that not all gaming machines that are suitable for implementing embodiments of the present disclosure necessarily include top wheels, top boxes, information panels, cashless ticket systems, and/or player tracking systems. Further, some suitable gaming machines may have only a single game display that includes only a mechanical set of reels and/or a video display, while others are designed for bar meters or table tops and have displays that face upwards.

Another example gaming machine 104B illustrated in FIG. 1 is the Arc™ model gaming machine manufactured by Aristocrat® Technologies, Inc. Note that, where possible, reference numerals identifying similar features of the gaming machine 104A embodiment are also identified in the gaming machine 104B embodiment using the same reference numbers. Gaming machine 104B does not include physical reels, but instead shows game play functions on main display 128. An optional topper screen 140 may be used as a secondary game display for bonus play to show game features or attraction activities while a game is not in play, or any other information or media desired by the game designer or operator. In some embodiments, topper screen 140 may also or alternatively be used to display progressive jackpot prizes available to a player during play of gaming machine 104B.

Example gaming machine 104B includes a main cabinet 116 including a main door 117 which opens to provide access to the interior of the gaming machine 1046. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming machine 104C shown is the Helix™ model gaming machine manufactured by Aristocrat® Technologies, Inc. Gaming machine 104C includes a main display 128A that is in a landscape orientation. Although not illustrated by the front view provided, the landscape-style main display 128A may have a curvature radius from top-to-bottom and/or from side-to-side. In some embodiments, main display 128A is a flat panel display. Main display 128A is typically used for primary game play while secondary display 1286 is typically used for a bonus game play, to show game features or attraction activities while the game is not in play or any other information or media desired by the game designer or operator. In some embodiments, example gaming machine 104C may also include speakers 142 to output various audio such as game sound, background music, etc.

Many different types of games, including mechanical slot games, video slot games, video poker, video black-jack, video pachinko, keno, bingo, and lottery, may be provided with or implemented within the depicted gaming machines 104A-104C and other similar gaming machines. Each gaming machine may also be operable to provide many different games. Games may be differentiated according to themes, sounds, graphics, type of game (e.g., slot game vs. card game vs. game with aspects of skill), denomination, quantity of paylines, maximum jackpot, progressive or non-progressive, bonus games, and may be deployed for operation in Class II or Class III, etc.

FIG. 2A is a block diagram depicting exemplary internal electronic components of a gaming machine 200 connected to various external systems. All or parts of the gaming machine 200 shown could be used to implement any one of the example gaming machines 104A-X depicted in FIG. 1. As shown in FIG. 2A, gaming machine 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming machine 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming machine 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming machine 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. In some embodiments, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

In some embodiments, game programs 206 can be set up to generate one or more game instances based on instructions and/or data that gaming machine 200 exchanges with one or more remote gaming machines, such as a central determination gaming system server 106 (not shown in FIG. 2A but shown in FIG. 1). For purpose of this disclosure, the term "game instance" refers to a play or a round of a game that gaming machine 200 presents (e.g., via a user interface (UI)) to a player. The game instance is communicated to gaming machine 200 via the network 214 and then displayed on gaming machine 200. For example, gaming machine 200 may execute game program 206 as video streaming software that allows the game to be displayed on gaming machine 200. When a game is stored on gaming machine 200, it may be loaded from memory 208 (e.g., from a read only memory (ROM)) or from the central determination gaming system server 106 to memory 208.

Gaming machines, such as gaming machine 200, are highly regulated to ensure fairness and, in many cases, gaming machine 200 is operable to award monetary awards (e.g., typically dispensed in the form of a redeemable voucher). Therefore, to satisfy security and regulatory requirements in a gaming environment, hardware and software architectures are implemented in gaming machines 200 that differ significantly from those of general-purpose computers. Adapting general purpose computers to function as gaming machines 200 is not simple or straightforward because of: (1) the regulatory requirements for gaming machines 200, (2) the harsh environment in which gaming machines 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming machine 200 generally involves complying with a certain level of randomness. Typically, gaming jurisdictions mandate that gaming machines 200 satisfy a minimum level of randomness without specifying how a gaming machine 200 should achieve this level of randomness. To comply, FIG. 2A illustrates that gaming machine 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming machine 200 can be a Class II gaming machine where RNG 212 generates RNG outcomes for creating Bingo cards. In one or more implementations, RNG 212 could be one of a set of RNGs operating on gaming machine 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming machine 200. In one implementation, instead of including RNG 212, gaming machine 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming machine 200 then uses the secure random numbers to generate game outcomes for one or more game features. In another implementation, the gaming machine 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming machine 200 includes ensuring a certain level of RTP. Similar to the randomness requirement discussed above, numerous gaming jurisdictions also mandate that gaming machine 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming machine 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming machine 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming machine 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming machine 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming machine 200.

During certain game events, the gaming machine 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming machine 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming machines 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming machine 104A-104X and 200 and a mobile device. After establishing a secure wireless connection between the gaming machine 104A-104X and 200 and the mobile device, the wireless transmitter or transceiver does not send and/or receive application data to and/or from the mobile device. Rather, the mobile device communicates with gaming machines 104A-104X and 200 using another wireless connection (e.g., WiFi® or cellular network). In another implementation, a wireless transceiver establishes a secure connection to directly communicate with the mobile device. The mobile device and gaming machine 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming machine (e.g., gaming machines 104A-104X and 200), the disclosure is not limited to those implementations shown in FIGS. 1 and 2. For example, not all gaming machines suitable for implementing implementations of the present disclosure necessarily include top wheels, top boxes, information panels, cashless ticket systems, and/or player tracking systems. Further, some suitable gaming machines have only a single game display that includes only a mechanical set of reels and/or a video display, while others are designed for bar counters or tabletops and have displays that face upwards. Gaming machines 104A-104X and 200 may also include other processors that are not separately shown. Using FIG. 2A as an example, gaming machine 200 could include display controllers (not shown in FIG. 2A) configured to receive video input signals or instructions to display images on game displays 240 and 242. In various embodiments, such display controllers may be integrated into the game controller 202. The use and discussion of FIGS. 1 and 2 are examples to facilitate ease of description and explanation.

Figure 2B:
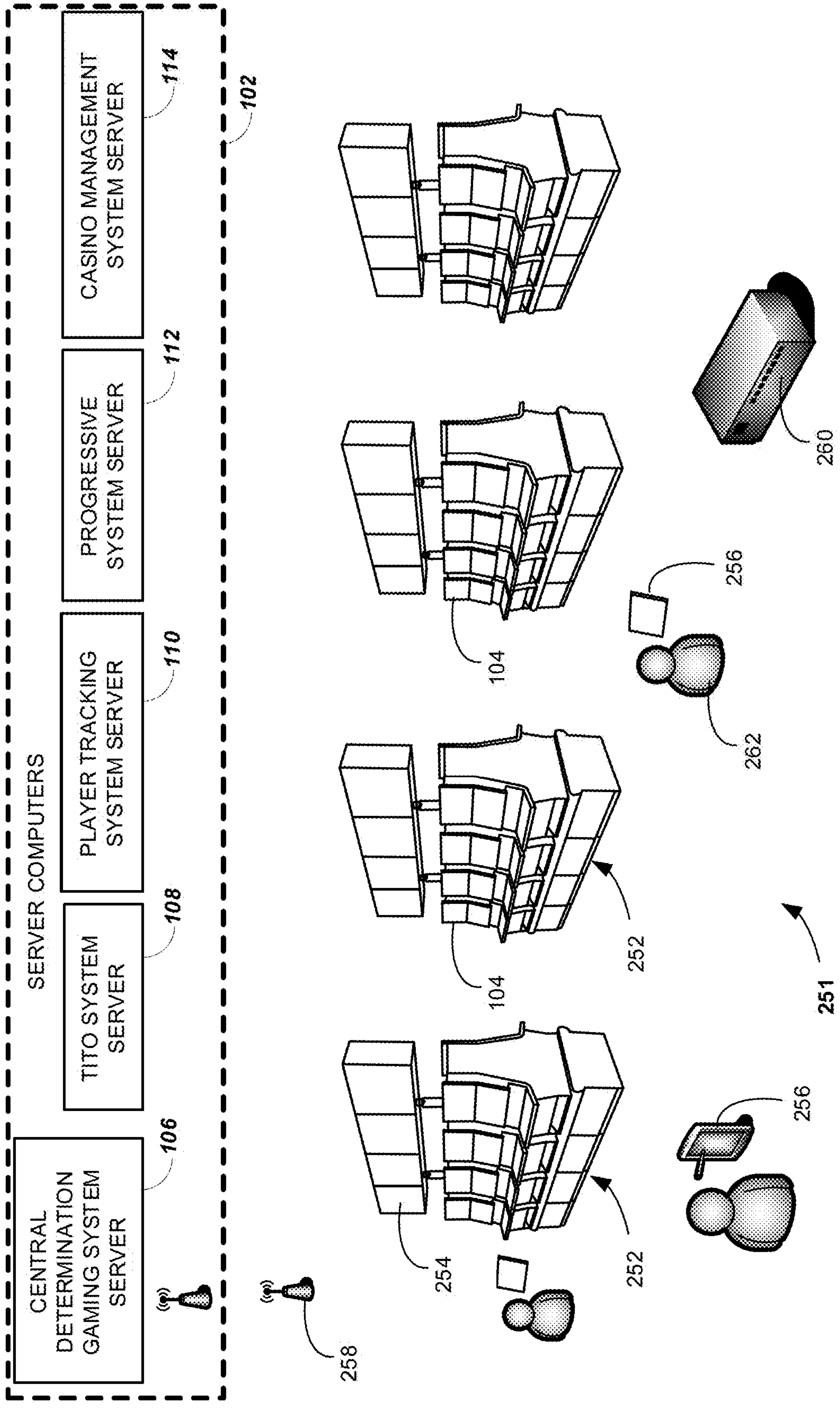
FIG. 2B depicts a casino gaming environment according to one example.

FIG. 2B depicts a casino gaming environment according to one example. In this example, the casino 251 includes banks 252 of gaming machines 104. In this example, each bank 252 of gaming machines 104 includes a corresponding gaming signage system 254. According to this implementation, the casino 251 also includes mobile gaming machines 256, which are also configured to present wagering games in this example. The mobile gaming machines 256 may, for example, include tablet devices, cellular phones, smart phones and/or other handheld devices. In this example, the mobile gaming machines 256 are configured for communication with one or more other devices in the casino 251, including but not limited to one or more of the server computers 102, via wireless access points 258.

According to some examples, the mobile gaming machines 256 may be configured for stand-alone determination of game outcomes. However, in some implementations the mobile gaming machines 256 may be configured to receive game outcomes from another device, such as the central determination gaming system server 106, one of the gaming machines 104, etc.

Some mobile gaming machines 256 may be configured to accept monetary credits from a credit or debit card, via a wireless interface (e.g., via a wireless payment app), via tickets, via a patron casino account, etc. However, some mobile gaming machines 256 may not be configured to accept monetary credits via a credit or debit card. Some mobile gaming machines 256 may include a ticket reader and/or a ticket printer whereas some mobile gaming machines 256 may not, depending on the particular implementation.

In some implementations, the casino 251 may include one or more kiosks 260 that are configured to facilitate monetary transactions involving the mobile gaming machines 256, which may include cash out and/or cash in transactions. The kiosks 260 may be configured for wired and/or wireless communication with the mobile gaming machines 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming machine 256 for wagering purposes, e.g., via a wireless link such as a near-field communications link. In some such examples, when a casino patron 262 is ready to cash out, the casino patron 262 may select a cash out option provided by a player interface of a mobile gaming machine 256, which may include a real button or a virtual button (e.g., a button provided via a graphical user interface) in some instances. In some such examples, the mobile gaming machine 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming machine 256 and/or a kiosk 260.

Some mobile gaming machines 256 may be configured for receiving and/or transmitting player loyalty information. For example, some mobile gaming machines 256 may be configured for wireless communication with the player tracking system server 110. Some mobile gaming machines 256 may be configured for receiving and/or transmitting player loyalty information via wireless communication with a patron's player loyalty card, a patron's smartphone, etc.

According to some implementations, a mobile gaming machine 256 may be configured to provide safeguards that prevent the mobile gaming machine 256 from being used by an unauthorized person. For example, some mobile gaming machines 256 may include one or more biometric sensors and may be configured to receive input via the biometric sensor(s) to verify the identity of an authorized patron. Some mobile gaming machines 256 may be configured to function only within a predetermined or configurable area, such as a casino gaming area.

Figure 2C:
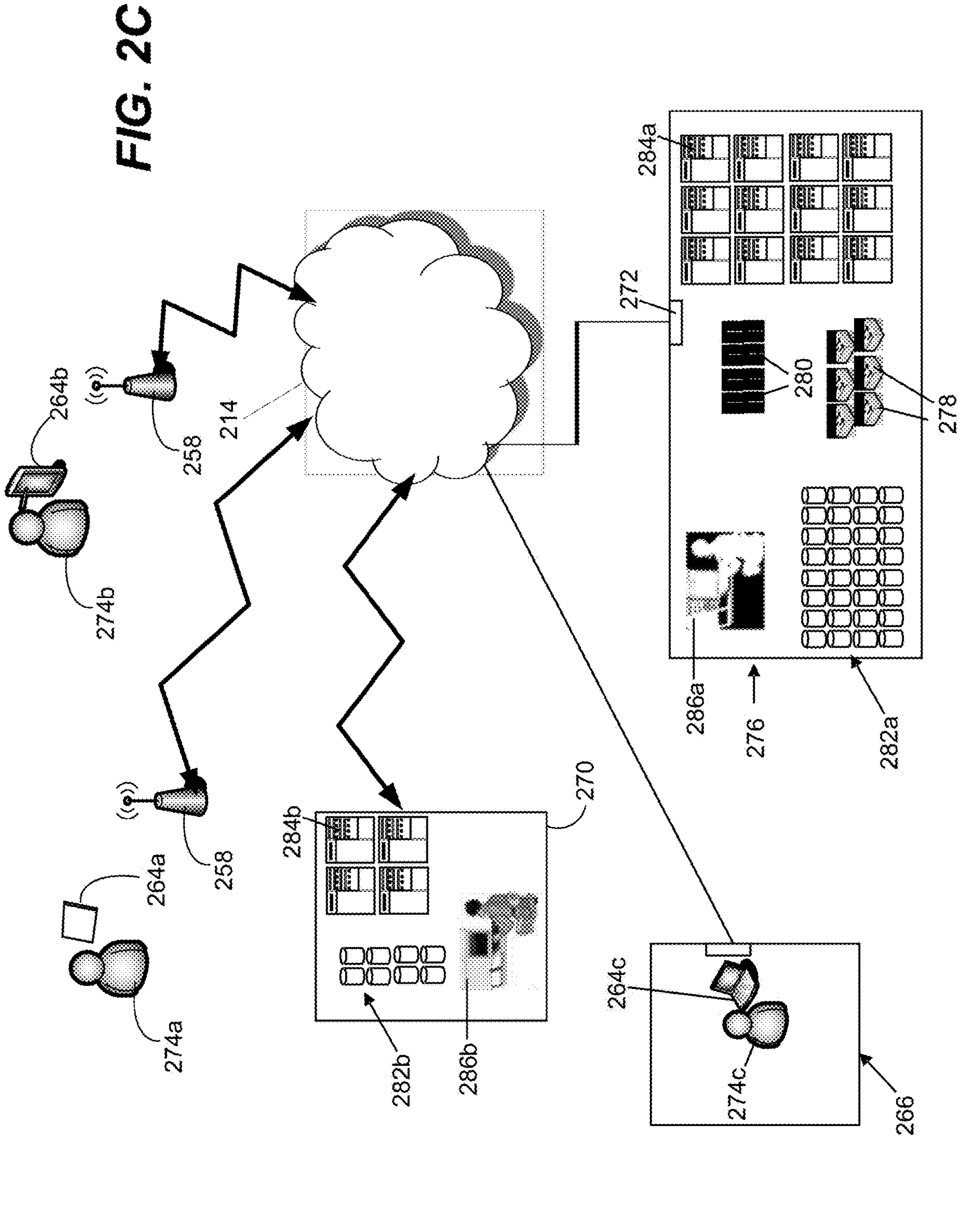
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the quantities, types and arrangements of gaming machines shown in FIG. 2C are merely shown by way of example. In this example, various gaming machines, including but not limited to end user devices (EUDs) 264*a*, 264*b* and 264*c* are capable of communication via one or more networks 214. The networks 214 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 214. The gaming data center 276 is capable of communication with the networks 214 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 214. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 214. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
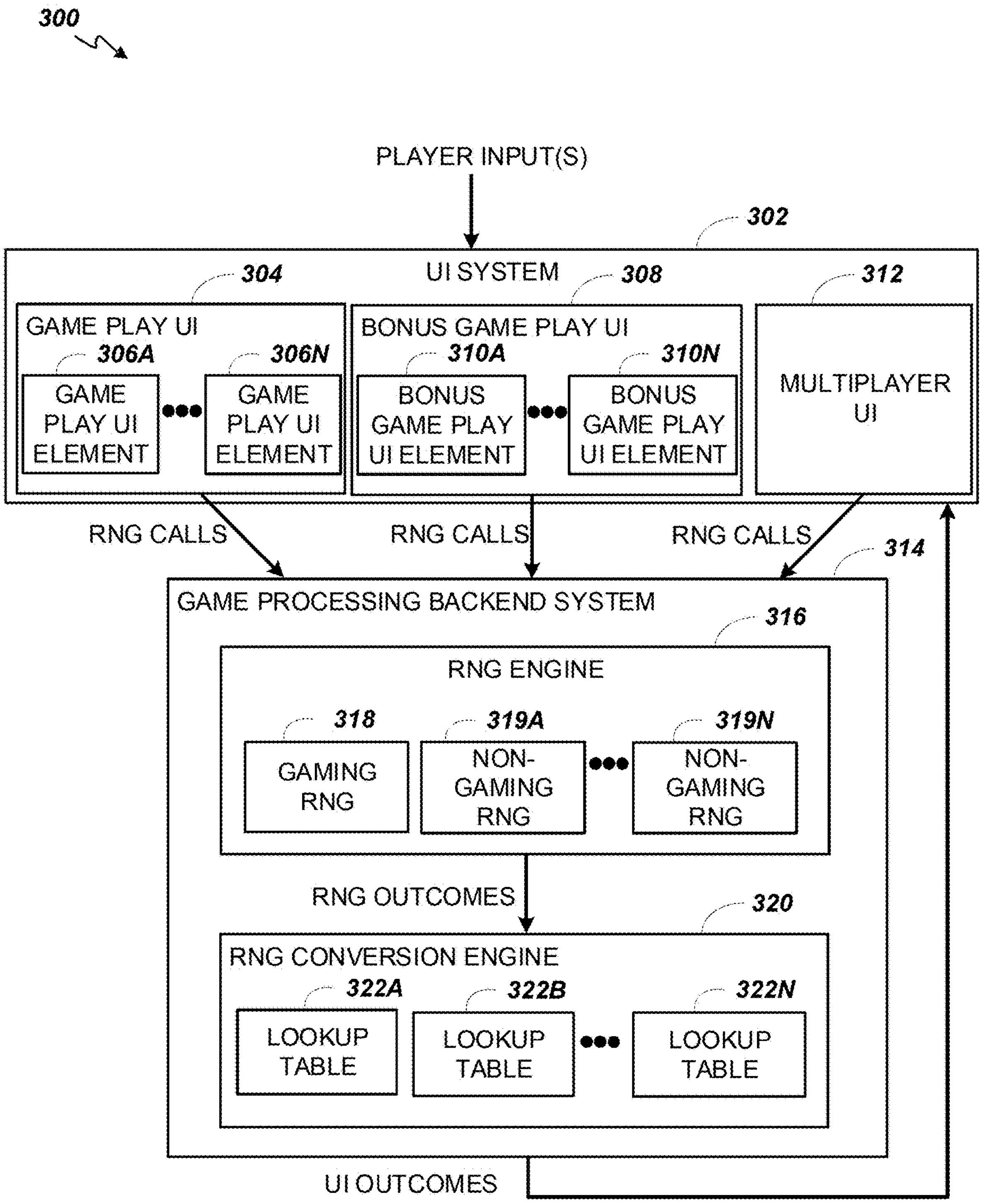
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming machine, such as gaming machines 104A-104X and 200 shown in FIGS. 1 and 2, respectively. In various embodiments, portions of the gaming processing architecture 300 can implement the game processing pipeline using a gaming machine and one or more remote gaming machines, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming machine transitions from a primary game mode that presents the base game to a tournament mode, a single gaming machine is linked and synchronized to other gaming machines to generate a tournament outcome. For example, multiple RNG engines 316 corresponding to each gaming machine could be collectively linked to determine a tournament outcome. To enhance a player's gaming experience, tournament mode can modify and synchronize sound, music, reel spin speed, and/or other operations of the gaming machines according to the tournament game play. After tournament game play ends, operators can switch back the gaming machine from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). In some embodiments, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming machine.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming machine pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In certain embodiments, UI outcomes are presented via one or more virtual reels displayed by the primary game display 240. The virtual reels may carry a virtual reel strip comprising an arrangement of symbols in a predetermined order. For example, as shown in FIG. 7, each reel strip 710A-710E may provide an ordered set of game symbols 730 selected from a predetermined set of game symbols. In one embodiment, the predetermined symbol set consists of seven different game symbols 730, which are represented by different letters (e.g. A, B, C, D, E, F, G) for ease of illustration. However, other embodiments may utilize a predetermined symbol set consisting of a different number of game symbols 730. Moreover, the game symbols 730 may take on other shapes, such as for example, different fruits (e.g., cherries, lemons, etc.), different gems (e.g., diamonds, rubies, etc.); different cookies (e.g., sandwich, chocolate chip, etc.); different candies (e.g., candy corn, gum ball, etc.) that may align with a particular theme of the gaming machine 200.

As further shown, each reel strip 710A-710E may include an ordered symbol set consisting of a fixed number of game symbols 730 that are arranged in a predefined order. In some embodiments, each reel strip 710A-710E may include the same fixed number of game symbols 730. However, in the depicted embodiment, each reel strip 710A-710E may provide an ordered symbol set having a different fixed number of game symbols 730. The ordered symbol set of each reel strip 710A-710E may be predetermined or predefined. Moreover, the gaming machine 200 may include multiple reel sets, wherein each reel set may comprise a different number of reel strips, carry different game symbols, specify a different order of game symbols, etc. Furthermore, while the reel strips 710A-710E are depicted as a linear set of symbols, the game machine 200 utilizes the reel strips 710A-710E in a circular manner such that the first reel stop (e.g., reel stop 0 of reel strip 710A) is adjacent to the last reel stop (e.g., reel stop 16 of reel strip 710A).

The game controller 202 or game processing backend system 314 may select a stop position for the one or more virtual reels based on one or more outcomes of the RNG 212, 244 or RNG engine 316. The stop position of the one or more reels then determines the symbols that are selected on the primary game display 240.

Hold-And-Spin Game

Figure 4:
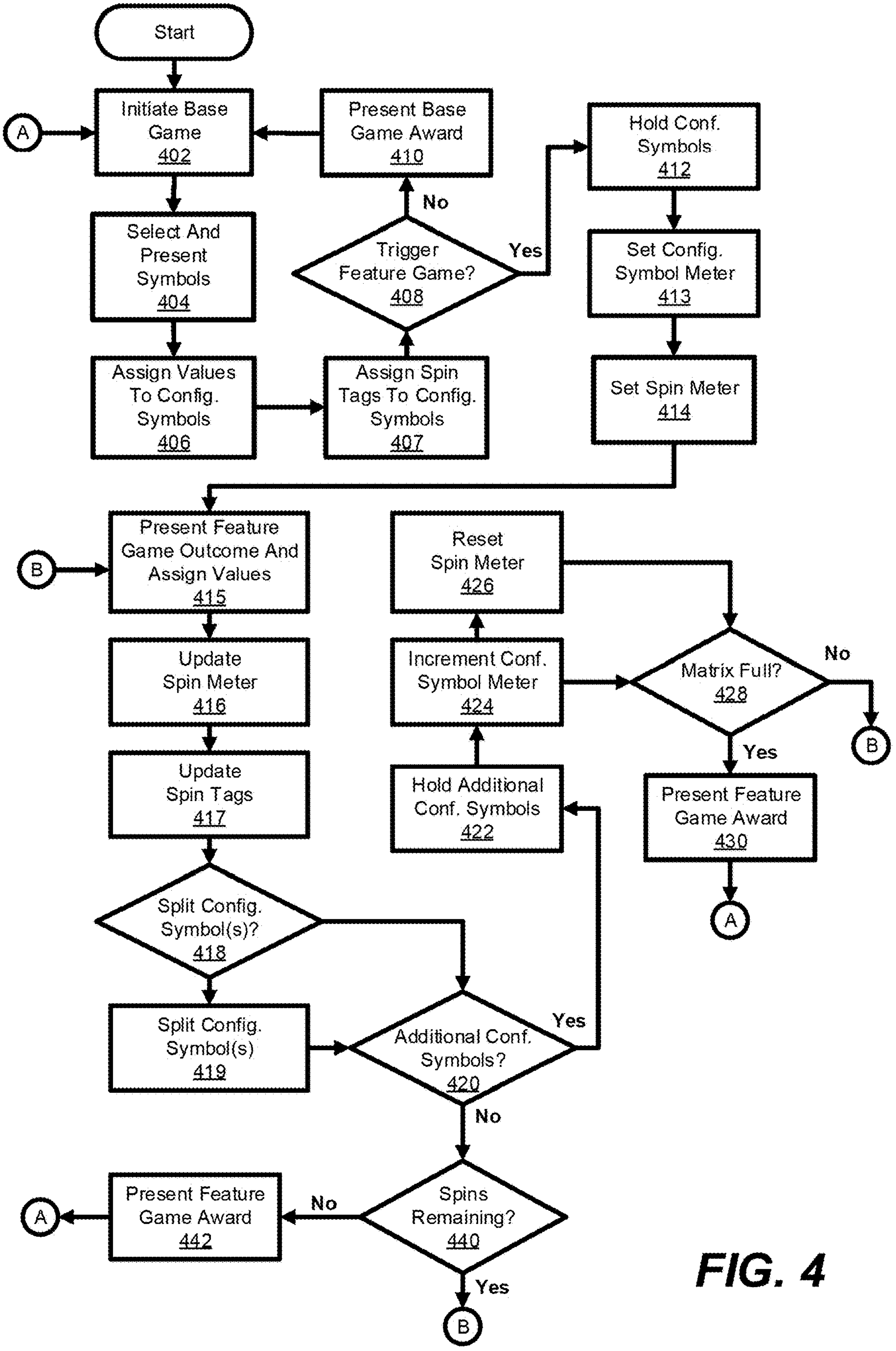
FIG. 4 provides a flowchart depicting operation of a gaming machine in accordance with a base game and a feature game of the present disclosure.

FIG. 4 provides a flowchart depicting operation of one embodiment of a gaming machine 200. Per the flowchart of FIG. 4, the gaming machine may provide a base game and a hold-and-spin game. The gaming machine 200 provides an initial quantity of spins to the hold-and-spin game. However, other terms such as games, rounds, instances, etc. may be more appropriate than the term spin for other feature games. Thus, references to spins should be interpreted to include games, rounds, instances, etc. with respect to these other feature games. Moreover, while the following describes the hold-and-spin game as a feature game whose play is triggered or initiated based on play of a base game, the hold-and-spin game or aspects thereof may be part of another game such as a base game, free game, etc. and/or may be initiated without regard to play of a base game.

As shown, the gaming machine 200 at 402 may initiate play of the base game in response to game controller 202 receiving input from a player interface of the gaming machine 200. In response to initiating play of the base game, a symbol selector 322A (see, e.g., FIG. 3) of the gaming machine 200 at 404 may select a plurality of symbols from a set of symbols and the gaming machine 200 may display the selected plurality of symbols as a base game outcome at the respective display positions arranged on primary game display 240. The set of symbols may be stored as symbol data (e.g., reel strips) in memory 208 and may include both configurable symbols and non-configurable symbols. FIG. 8A depicts a single configurable symbol 600. Conversely, FIGS. 8B and 8C each depicts a group of configurable symbols 600. As shown in FIGS. 6C and 6D, the game controller 202 may present a group of configurable symbols 600 at a single display position.

At 406, the game controller 202 may assign indicia to the variable component of each configurable symbol 600. In particular, a configurable symbol 600 may comprise a common component 602, a variable component 604, and an optional spin tag 606. See, e.g., FIGS. 8A-8C. The variable component 604 may indicate a value of a prize that is associated with each of the configurable symbols 600. The spin tag 606 may indicate a number of additional spins before splitting the associated configurable symbol 600. The common component 602 may provide a base symbol such as the pearl symbol shown in FIGS. 6A-6D that is common to all configurable symbols 600 or to a category of configurable symbols 600. As shown, in FIGS. 6A-6D and 8A-8C, the common component 602 may comprises a pearl symbol, the variable component 604 may comprise an indicia overlaying the common component (e.g., pearl symbol), and the spin tag 606 may comprise an encircled value (e.g., 1, 2, 3, etc.) overlaying the common component 602.

In certain embodiments, indicia of the variable components 604 are numerals directly indicative of the numeric value of a prize. In other embodiments, the indicia of the variable components 604 may indirectly indicate the numeric value of the prize. For example, the indicia may comprise a textual label such as Grand, Mega, Major, Minor, or Mini having an associated fixed, progressive, or jackpot prize. In one embodiment, the Grand and Mega have corresponding progressive prizes and the Major, Minor, and Mini have fixed prizes that adjust proportionally with the amount wagered in a base game. In some embodiments, the current value for the Grand, Major, Minor, and Mini prizes may be displayed by an associated Grand meter 540, Mega meter 542, Major meter 544, Minor meter 546, and Mini meter 548 presented by the primary game display 240 and/or the secondary game display 242. In some embodiments, the variable component 604 and/or spin tag 606 of a configurable symbol 600 may be displayed on or assigned to the common component 602 prior to, during, or after the spinning of the reels.

In some embodiments, at least one value of the respective prizes is generated by randomly selecting one of a plurality of defined multipliers that is applied to an amount wagered on the base game from which the feature is game triggered. To this end, game controller 202 at 406 may select the predefined multipliers based on a value obtained from the RNG 212, 244, or 318, apply the multiplier to the initial wager, or select a table of values corresponding to the applied multiplier to obtain a prize value, and assign the prize value to each of the configurable symbols 600. The plurality of defined multipliers in some such embodiments may be selected at random according to a weighted probability based at least in part on the amount wagered on the base game. That is, the game controller 202 may obtain a value from RNG 212, 244, or 318 and may use this value to determine from the weighted table which value to assign to a configurable symbol 600. In an embodiment, the assignment of values to the configurable symbols 600 is performed by game controller 202 after the symbols have been selected and the game controller 202 knows they will be displayed, but before they are displayed on the display. In another embodiment, the assignment occurs after the symbols have been displayed on display 240. In another embodiment, values are assigned to all configurable symbols 600 irrespective of whether they will be displayed. In this manner, the game controller 202 may scale the values assigned to the configurable symbols 600 based on the wager.

At 407, the game controller 202 may assign spin tags 606 to the configurable symbols 600. As noted above, the spin tags 606 are optional, not all configurable symbols 600 necessarily include a spin tag 606. Thus, in some embodiments, the game controller 202 may randomly determine whether a configurable symbol 600 will receive a spin tag 606. In other embodiments, the reel strips may be populated with tagged configurable symbols 600 and untagged configurable symbols 600. In such embodiments, the game controller 202 may assign values to spin tags 606 of the tagged configurable symbols 600 on the reel strips and not assign spin tags 606 or spin tag values to the untagged configurable symbols 600 on the reel strips. In various other embodiments, the game controller 202 may assign a spin tag 606 to a quantity of configurable symbols 600. That quantity may be predetermined, or randomly determined. It may further be based on other factors such as amount wagered, a trigger event, a base game outcome, etc.

At 407, the game controller 202 may select numeric values for each spin tag 606 based on a value obtained from the RNG 212, 244, or 318. The values for the spin tags 606 in some such embodiments may be selected at random according to a weighted probability from a table of possible values. This may be based at least in part on the amount wagered on the base game, i.e., each denomination and or wager amount may have a corresponding table. In an embodiment, the assignment of values to the spin tags 606 is performed by game controller 202 after the symbols have been selected and the game controller 202 knows they will be displayed, but before they are displayed on the display. In another embodiment, the assignment occurs after the symbols have been displayed on display 240. In another embodiment, values are assigned to all spin tags 606 irrespective of whether they will be displayed.

At 408, the game controller 202 may monitor play of the base game and determine whether a trigger event has occurred. In certain embodiments, a trigger event occurs when the base game outcome includes (i) a predetermined quantity (e.g., six) of configurable symbols 600 on the primary game display 240 or (ii) a predetermined quantity (e.g., six) of display positions of the primary game display include configurable symbols 600. If a trigger event has not occurred, the game controller at 410 may determine and present awards for any winning symbol combinations in the base game outcome and return to 402 for further plays of the base game. However, if a trigger event does occur, the game controller 202 may initiate a feature game in addition to determining and presenting awards for any winning symbol combinations. In particular, the game controller 202 at 412 may hold each configurable symbol 600 in the base game outcome at its respective display position $524_1$-$524_{15}$. See, e.g., FIG. 5. The game controller 202 at 413 may set the configurable symbol meter 510 of FIG. 5 to (i) the quantity of configurable symbols 600 that are held on reels $514_1$-$514_{15}$ or (ii) the quantity of display positions with configurable symbols 600. In some embodiments, the quantity of configurable symbols 600 held on reels $514_1$-$514_{15}$ is also the quantity of configurable symbols 600 which originally triggered the feature game. That is, in some such embodiments, the configurable symbol meter 510 is initially set to six (6), as six (6) configurable symbols 600 trigger the feature game. In various embodiments, for example, if the base game outcome includes seven (7) configurable symbols 600 or seven (7) display positions with configurable symbols 600, but only six (6) are required for triggering the feature game, the game controller 202 may initially set the configurable symbol meter 510 to seven (7) (i.e., equal to the quantity of configurable symbols 600 or the quantity of display positions with configurable symbols 600 in the base game outcome).

In addition to setting the configurable symbol meter 510, the game controller 202 at 414 may set a spin meter 512 to an initial quantity of spins. For example, in an embodiment, the game controller 202 may set the spin meter 512 to a predetermined quantity (e.g., 2, 3, 4, etc.) of spins. In other embodiments, the game controller 202 may set the spin meter 512 to a quantity that is dependent upon a base game outcome. For example, the quantity of configurable symbols 600 or the quantity of display positions with configurable symbols 600 in the base game outcome may influence the initial quantity of the spin meter 512.

At 415, the game controller 202 may present a feature game outcome on display 240. Similar to the base game, the game controller 202 may select symbols from symbol data (e.g., reel strips) and cause the selected symbols to be displayed at display positions $524_1$-$524_{15}$ that do not already display a configurable symbol 600. Note that in certain embodiments, the game controller 202 may select symbols for the feature game outcome from a full set of available symbols including any configurable symbols 600. In other embodiments, the symbol selector 322A may select the symbols for the feature game outcome from a reduced set of symbols that take into account any configurable symbols 600 already held. For example, in one or more embodiments, only configurable symbols 600 and blank symbols may be available for selection. In other words, the reel strips for the feature game may contain only configurable symbols 600 and blank symbols (e.g., positions without any symbol). In another embodiment, the symbols may be selected for the feature game from an increased set of symbols. For example, symbols may be purchased or otherwise added to one or more the reel strips prior to initiating the feature game or spin of the feature game. If one or more configurable symbols 600 are selected, in this example, the game controller 202 at 415 may assign randomly selected values to variable component 604 of each configurable symbol 600. As explained above, such values may be based upon an amount wagered in the base game. The game controller 202 at 415 may also randomly determine for each configurable symbol 600 whether to tag the configurable symbol 600 with a spin tag 606 and assign a value to the spin tag 606 of tagged configurable symbols 600.

After presenting the feature game outcome, the game controller 202 at 416 may update the spin meter 512 by a defined amount. For example, the game controller 202 may update the spin meter 512 by decrementing the value of the spin meter 512 by the defined amount (e.g., 1, 2, 3, etc.), regardless of whether a configurable symbol 600 is displayed. In other embodiments, the game controller 202 may update the spin meter 512 by incrementing the value of the spin meter 512 by a defined amount (e.g., 1, 2, 3, etc.)

Similarly, the game controller 202 at 417 may update the numeric value of any spin tags 606 by a defined amount. For example, the game controller 202 may update each spin tag 606 by decrementing the numeric value of each spin tag 606 by the defined amount (e.g., 1, 2, 3, etc.). In other embodiments, the game controller 202 may update each spin tag 606 by incrementing the numeric value of the spin tag 606 by the defined amount (e.g., 1, 2, 3, etc.).

In some embodiment, a base game outcome or other triggering condition may alter the defined amount by which the numeric value of the spin tags 606 are updated. As will be apparent from the below, updating the numeric values of the spin tags 606 by larger amounts will increase the rate at which configurable symbols 600 split during the feature game.

At 418, the game controller 202 may determine whether to split any of the tagged configurable symbols 600 based on their respective spin tags 606. In particular, the game controller 202 may determine to split a tagged configurable symbol 600 if its spin tag 606 reaches or passes a predetermined threshold. For example, in one embodiment, the game controller 202 decrements the spin tags 606 by a defined amount of one (1) and determines to split a tagged configurable symbol 600 when its spin tag 606 reaches or passes a threshold value of zero (0). In such an embodiment, the spin tags 606 effectively depict the number of additional spins required before splitting the associated configurable symbol 600.

If the game controller 202 determines at 418 that one or more configurable symbols 600 are to be split, then the game controller 202 at 419 splits the corresponding configurable symbols 600 per a split factor. In one embodiment, the game controller 202 splits a respective configurable symbol 600 based on a split factor of two (2) to obtain two configurable symbols 600 that have the same variable component 604. For example, if a configurable symbol 600 has a numeric value of fifty (50) as its variable component 604, then the game controller 202 may split the configurable symbol 600 into a group of configurable symbols comprising two configurable symbols 600 that each have a numeric value of fifty (50). See, e.g., FIG. 8B which depicts a group of configurable symbols 600 resulting from splitting the tagged configurable symbol 600 shown in FIG. 8A by a split factor of two. Moreover, the configurable symbols 600 obtained from the split may replace the original configurable symbol 600, thus resulting in a group of configurable symbols comprising two (corresponding to the split factor of two) configurable symbols 600 being presented at the display position of the original configurable symbol 600. In such an embodiment, splitting of a configurable symbol 600 into two configurable symbols 600 effectively doubles a prize associated with the original configurable symbol 600, since each of the two symbols will be used to determine the award amount at the end of the hold-and-spin round.

As explained above, the game controller 202 may use a split factor of two to split configurable symbols 600 into two configurable symbols 600. The game controller 202 in other embodiments may use a different split factor such as three, four, etc. to respectively split a configurable symbol into three, four, etc. configurable symbols. In some embodiments, the game controller 202 may randomly determine the split factor separately for each configurable symbol to be split or for each round of the hold-and-spin game. The random determination may be based on a weighted table of split factors. In other embodiments, the split factor may be based on a base game outcome or another triggering event.

As explained above, the game controller 202 may provide each configurable symbol 600 resulting from the split with the variable component 604 of the configurable symbol 600 being split. However, in some embodiments, the variable component 604 of each configurable symbol 600 may be randomly determined. In some embodiments, the variable components 604 are randomly generated such that their total values fall within a range specified by variable component 604 of the original configurable symbol 600. For example, the variable components 604 may be randomly generated such that the total values fall within a range of from (1×split factor×variable component) to (2×split factor ×variable component). For example, if the split factor is two and the variable component 604 of the original configurable symbol 600 is 100, then the game controller 202 may generate the variable components 604 such that their total falls within the range of 200 (1×split factor of 2×variable component of 100) to 400 (2×split factor of 2×variable component of 100). For such an embodiment, the following pairs of variable component values are a few of the valid possibilities: (100, 100); (50, 150); (200, 200); (100, 200).

When splitting a configurable symbol 600, the game controller 202 may further assign a spin tag 606 to each configurable symbol 600 in the group of configurable symbols so as to permit further spitting of the configurable symbols 600 in the group. In other embodiments, the game controller 202 only assigns spin tags 606 to configurable symbols 600 carried over from the base game. See, e.g., step 407. In some embodiments, the game controller 202 may limit the number of times a configurable symbol 600 may be split or the number of configurable symbols 600 that may reside at a single display position. For example, the game controller 202 may elect to assign no spin tag 606 to a configurable symbol 600 if the number of configurable symbols 600 at a display position has reached its limited (e.g., four, eight, etc.) In some embodiments, the game controller 202 may assign a numeric value to a spin tag 606 equal to the spin tag 606 originally assigned to the configurable symbol 600. In other embodiments, the assigned numeric value may be predetermined (e.g., 2, 3, etc.) or randomly selected from a predetermined range (e.g., between 1 and 4). In yet other embodiments, the game controller 202 may randomly determine whether to assign a spin tag 606 thus resulting in some split configurable symbols 600 receiving new spin tags 606 and other split configurable symbols 600 not receiving new spin tags 606. In various embodiments, the configurable symbols 600 regardless of whether split or assigned a spin tag 606 are still held for the remainder of the hold-and-spin game.

The game controller 202 at 420 may monitor play of the feature game and determine whether at least one display position without a configurable symbol 600 received a configurable symbol 600 at 415, thus increasing the number of display positions in the feature game outcome. If the game controller 202 determines that the number of display positions with configurable symbols 600 increased, then the game controller 202 at 422 may hold each of the configurable symbols 600 at their respective display positions $524_1$-$524_{15}$. Furthermore, the game controller 202 at 424 may increment the configurable symbol meter 510 to reflect the total quantity of display positions $524_1$-$524_{15}$ that are presenting configurable symbols 600 in the feature game outcome. The game controller 202 at 426 may also reset the value of the spin meter 512. In one embodiment, the game controller 202 resets the spin meter 512 to the initial spin value (e.g., 3). In this manner, the game controller 202 may award the player additional spins for the feature game in response to increasing the number of display positions with configurable symbols 600.

At 428, the game controller 202 may determine whether the matrix of display positions $524_1$-$524_{15}$ has filled with configurable symbols 600 by determining whether each of the display positions $524_1$-$524_{15}$ includes at least one configurable symbol 600. If the game controller 202 determines that the matrix of display positions $524_1$-$524_{15}$ has not been filled with configurable symbols 600, the game controller 202 may return to 415 to conduct another spin of the feature game. However, if the game controller 202 determines that the game controller 202 has filled the matrix of display positions $524_1$-$524_{15}$ with configurable symbols 600, then the game controller 202 may at 430 present an award, via the display 240, that is based on the indicia depicted by the configurable symbols 600 as well as the amount of the Grand prize shown by the Grand meter 540. In one embodiment, the game controller 202 presents the award by stepping through each display position $524_1$-$524_{15}$ of the matrix and adding the value(s) of its respective configurable symbol(s) 600 to win meter 508 of FIG. 5. Other manners of presenting the award are contemplated and may be encompassed by the appended claims. After presenting the award, the game controller 202 may end the feature game and return to 402 for further plays of the base game.

Referring back to 420, if the game controller 202 determines that the number of display positions with at least one configurable symbol 600 did not increase, then the game controller 202 may proceed to 440. At 440, the game controller 202 may determine whether if any spins for the feature game remain. If spins remain, the game controller 202 may return to 415 in order to spin the reels and present an updated feature game outcome. If no spins remain, the game controller 202 at 440 may determine to end the feature game. In response to ending the feature game, the game controller 202 at 442 may present, via display 240, any remaining awards. In one embodiment, the game controller 202 presents the award by stepping through each display position $524_1$-$524_{15}$ of the matrix and adding the value(s) of its respective configurable symbol(s) 600 (i.e., values of both configurable symbols 600 that split and configurable symbols 600 that did not split) to the win meter 508. After presenting the award, the game controller 202 may return to 402 for further plays of the base game.

In some embodiments, the base game may not present configurable symbols 600. In such embodiments, a feature game may be awarded in response to other triggering conditions. For example, in some embodiments, after a feature game is triggered, the game controller 202 may initiate a feature game using different reels than those used in the base game. In such embodiments, the feature game may trigger a hold-and-spin game in response to the feature game presenting a threshold quantity of configurable symbols 600 in the manner described above. In some embodiments, the hold-and-spin game may be triggered randomly or in response to certain symbol combinations achieved in the base game or another feature game. In some embodiments, the number of symbol positions in the feature game may be more than the symbol display positions in the base game.

Figure 5:
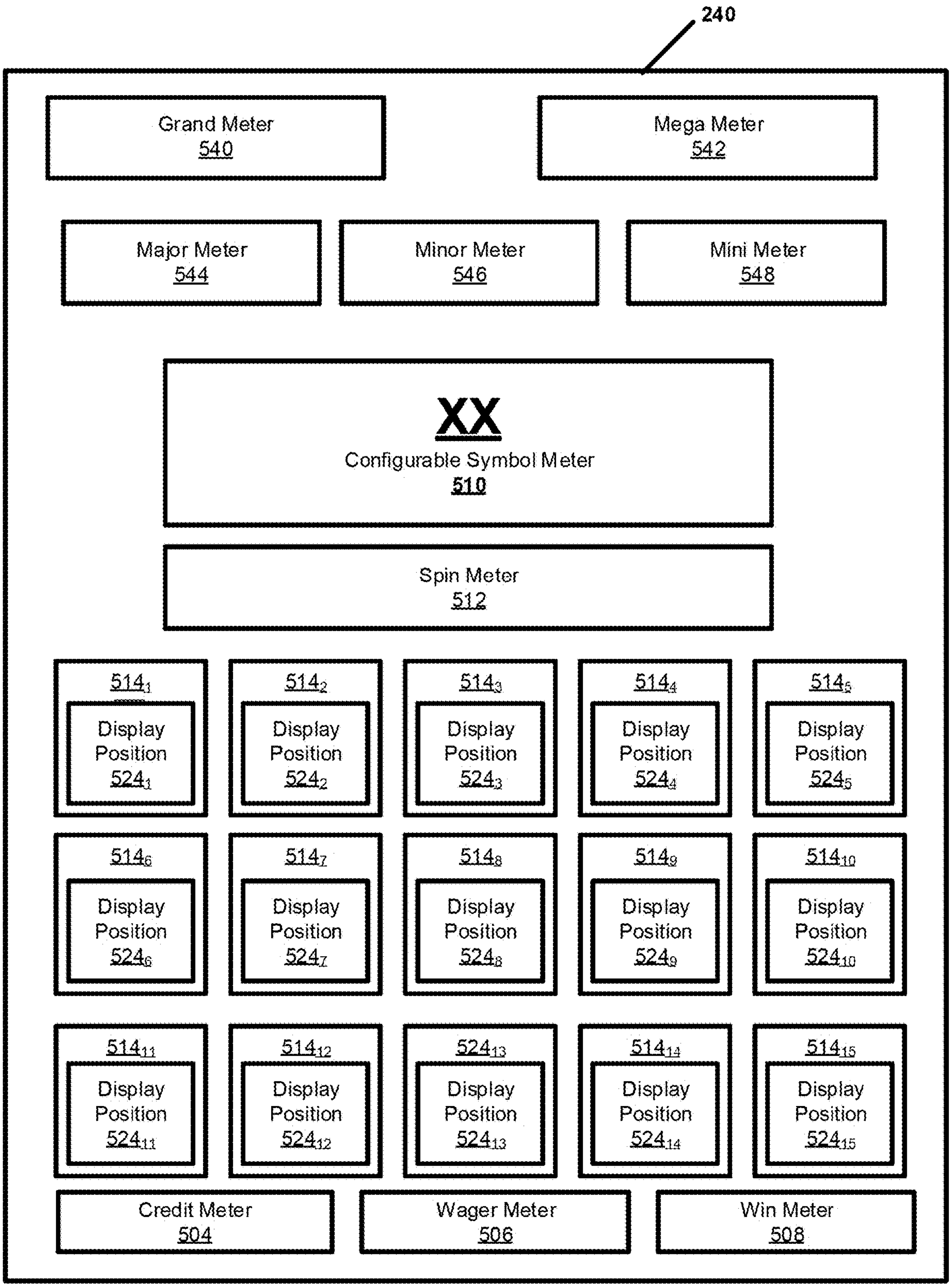
FIG. 5 provides an example display screen of the feature game of FIG. 4.

In some embodiments, the display 240 may associate individual reels with each of the display positions. For example, as shown in FIG. 5, if there are fifteen (15) display positions $524_1$-$524_{15}$, the display 240 may present fifteen separate reels $514_1$-$514_{15}$, one for each of the fifteen (15) display positions $524_1$-$524_{15}$. Each of the reels $514_1$-$514_{15}$ may include a mixture of non-configurable symbols and configurable symbols 600. Before the hold-and-spin game, the game controller 202 in some examples may set the configurable symbol meter 510 to zero and hold none of the configurable symbols 600 that triggered the hold-and-spin game. In such an embodiment, the game controller 202 for the first spin of the hold-and-spin game selects reel stop positions for all of the reels $514_1$-$514_{15}$. If any of the reels $514_1$-$514_{15}$ are stopped with a configurable symbol 600 in place, that configurable symbol 600 may be held in position by holding/locking the respective reel $514_1$-$514_{15}$ (i.e., not spinning the held/locked reels in a subsequent game). That is, in subsequent spins according to this example, only the reels $514_1$-$514_{15}$ corresponding to symbol positions where a configurable symbol 600 has not been displayed are spun.

Example Play of Hold-And-Spin Game

More specific examples of embodiments of the present disclosure are now described with reference to FIGS. 5 and 6A-6D. In the embodiment described below, the display positions of the symbol display are arranged in a rectangular matrix comprising a plurality of columns and a plurality of rows. In particular, examples of FIGS. 6A-6D provide a hold-and-spin feature that utilizes a 3×5 matrix of display positions $524_1$-$524_{15}$ as shown in FIG. 5. However, other arrangements known in the gaming industry could be employed in embodiments of the disclosure. For example, in some arrangements, there are more symbols in some columns than in others, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighboring reel.

In the embodiment of FIGS. 6A-6D, the hold-and-spin feature is triggered when a base game outcome includes at least six (6) configurable symbols 600 or at least six (6)

display positions with at least one configurable symbol 600. The configurable symbols 600 of FIGS. 6A-6D are shown as having a pearl symbol as a common component 602. Thus, the base game outcome of FIG. 6A triggers the hold-and-spin feature because the base game outcome includes six (6) configurable symbol 600. In particular, the base game outcome includes a configurable symbol 600 at each display position of column 1 (i.e., display positions $\mathbf{524}_1$, $\mathbf{524}_6$, $\mathbf{524}_{11}$), the top two display positions of column 2 (i.e., display positions $\mathbf{524}_2$, $\mathbf{524}_7$), and the top display position of column 5 (i.e., display position $\mathbf{524}_5$). Furthermore, in the shown embodiment, the game controller 202 assigns a spin tag 606 to each configurable symbol 600 with a numeric variable component 604. In other words, configurable symbols 600 with a textual indicia (e.g., Grand, Major, Minor, etc.) are not assigned a spin tag 606 and thus do not split during the course of the feature game. However, other embodiments may assign tag symbols to configurable symbols 600 with textual indicia or to configurable symbols 600 with a subset of the textual indicia (e.g., only Minor and Mini). As further, shown the game controller 202 may randomly assign different initial values (e.g., 2, 3, etc.) to the spin tags 606.

At this point, the game controller 202 may set the configurable symbol meter 510 to six (6) to reflect the quantity of display positions with held configurable symbols 600. Moreover, in one embodiment, the game controller 202 is guaranteed to present an award for the hold-and-spin game that includes at least the accumulated value indicated by the variable components 604 of the six configurable symbols 600. That is, even before play of hold-and-spin starts, the configurable symbols 600 of FIG. 6A, which triggered the hold-and-spin feature, provide an award of 3,600 credits (i.e., the accumulated sum of the variable components 604).

Figure 6B:
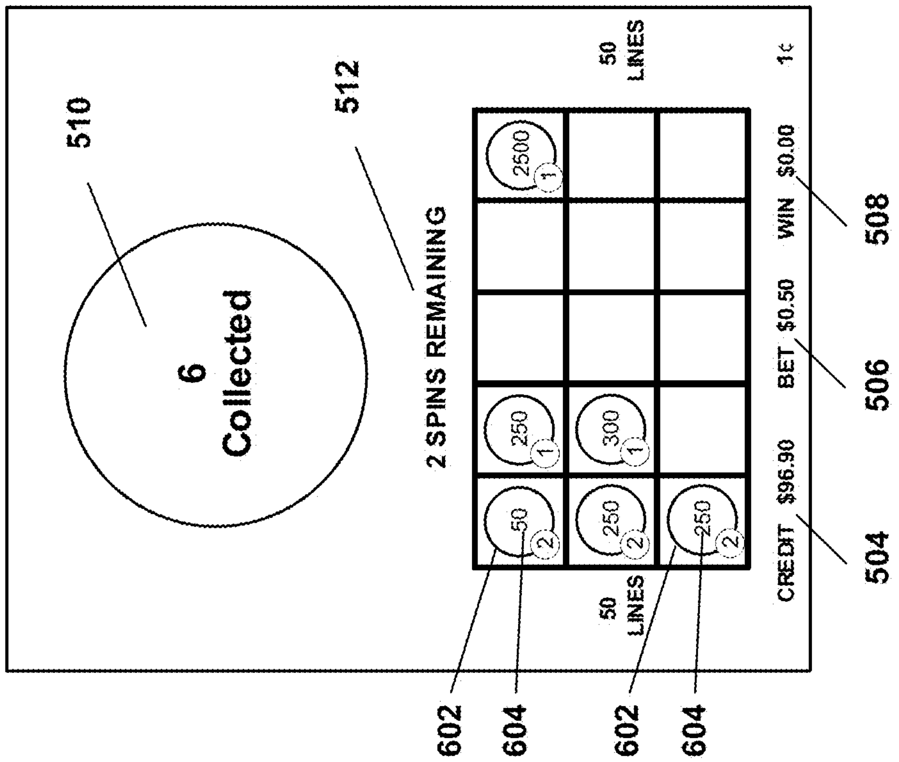
FIGS. 6A to 6D present a series of display screens depicting operation of a gaming machine per the process of FIG. 4.
Figure 6A:
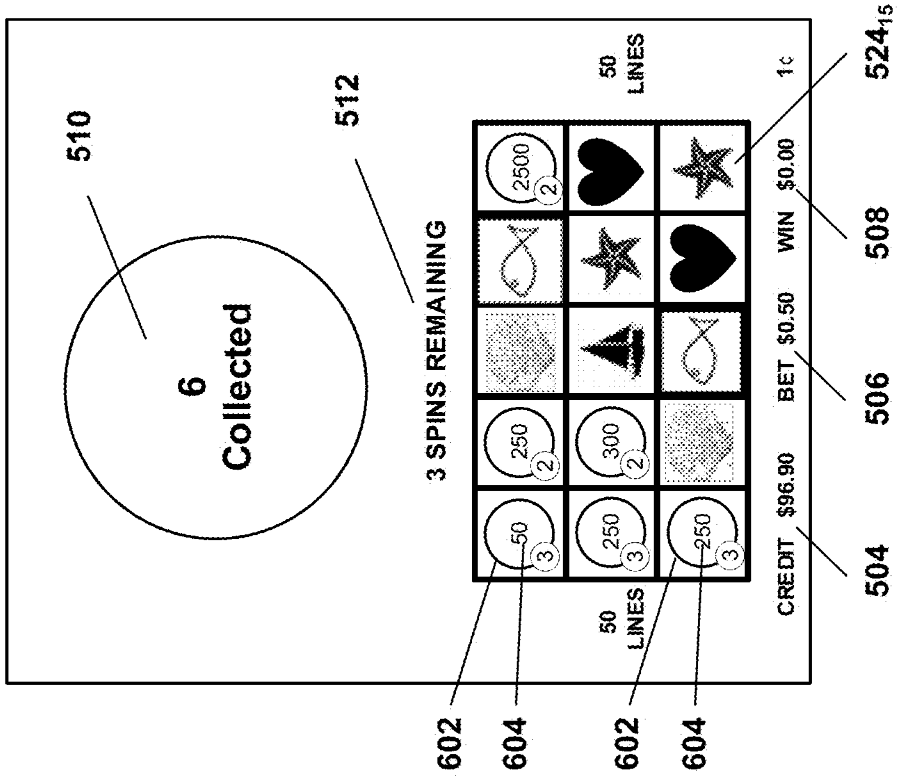
Figure 6D:
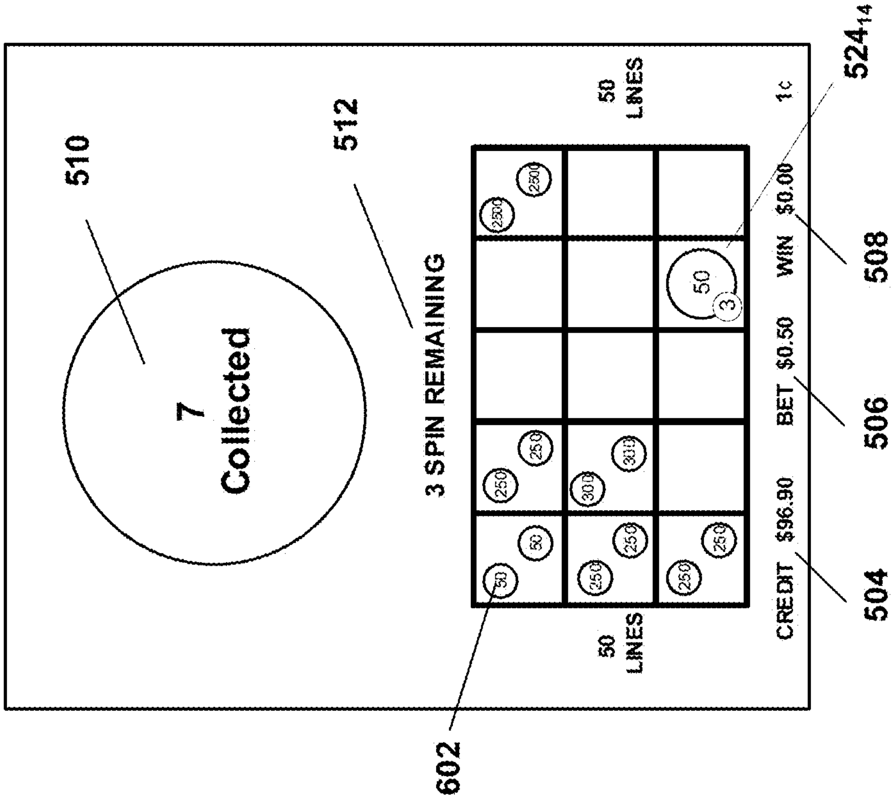
Figure 6C:
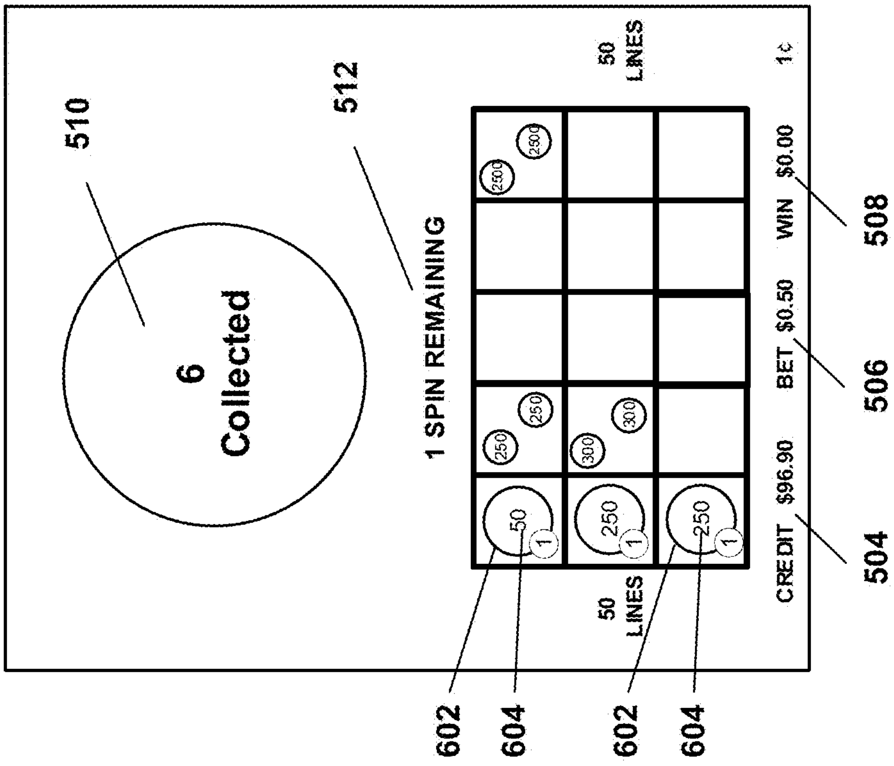

FIG. 6B depicts the hold-and-spin feature after the game controller 202 has spun the reels $\mathbf{514}_3$, $\mathbf{514}_4$, $\mathbf{514}_8$, $\mathbf{514}_9$, $\mathbf{514}_{10}$, $\mathbf{514}_{12}$, $\mathbf{514}_{13}$, $\mathbf{514}_{14}$ to update the feature game outcome of FIG. 6A. See, FIG. 5 for reel designations. The spin failed to add any additional configurable symbols 600 to the feature game outcome. However, as shown, the value of the spin meter 512 and the values of the spin tags 606 have been updated (e.g., decremented by one).

FIG. 6C depicts the hold-and-spin feature after the game controller 202 has spun the reels $\mathbf{514}_3$, $\mathbf{514}_4$, $\mathbf{514}_8$, $\mathbf{514}_9$, $\mathbf{514}_{10}$, $\mathbf{514}_{12}$, $\mathbf{514}_{13}$, $\mathbf{514}_{14}$ to update the feature game outcome of FIG. 6B. The spin again failed to add any additional configurable symbols 600 to the feature game outcome. However, as shown, the value of the spin meter 512 and the values of the spin tags have been updated (e.g., decremented by one). Such update has reduced the spin tags for the configurable symbols at positions $\mathbf{524}_2$, $\mathbf{524}_5$, $\mathbf{524}_7$ to a threshold value of zero. Accordingly, the game controller 202 has split the configurable symbols 600 at these positions based on a split factor of two. Such a split factor may have been randomly determined by the game controller 202, predefined for the feature game, or based on a result of the base game. Moreover, as shown, the game controller 202 has not tagged the configurable symbols obtained from the split. In one embodiment, the game controller 202 may have determined not to tag the configurable symbols 600 based on a random outcome.

FIG. 6D depicts the hold-and-spin feature after the game controller 202 has spun the reels $\mathbf{514}_3$, $\mathbf{514}_4$, $\mathbf{514}_8$, $\mathbf{514}_9$, $\mathbf{514}_{10}$, $\mathbf{514}_{12}$, $\mathbf{514}_{13}$, $\mathbf{514}_{14}$ to update the feature game outcome of FIG. 6C. The spin has added an additional configurable symbol 600 to the feature game outcome at position $\mathbf{524}_{14}$. As a result of the new display position with a configurable symbol 600, the game controller 202 has updated the symbol meter 510 to reflect the quantity of display positions with configurable symbols 600, which is seven (7). Furthermore, the game controller 202 has reset the spin meter 512 to the initial spin value of three (3). Furthermore, the game controller 202 has updated the spin tags 606 (e.g., decremented by one). Such update has reduced the spin tags for the configurable symbols 600 at positions $\mathbf{524}_1$, $\mathbf{524}_6$, $\mathbf{524}_{11}$ to a threshold value of zero. Accordingly, the game controller 202 has split the configurable symbols 600 at these positions based on a split factor of two. Such a split factor may have been randomly determined by the game controller 202, predefined for the feature game, or based on a result of the base game. Moreover, as shown, the game controller 202 has not tagged the configurable symbols 600 obtained from the split. In one embodiment, the game controller 202 may have determined not to tag the configurable symbols 600 based on a random outcome. Finally, the game controller 202 has tagged the new configurable symbol 600 at position $\mathbf{524}_{14}$ with a spin tag 606 having a value of three (3). The game controller 202 may have randomly determined to tag the configurable symbol 600. Similarly the game controller 202 may have randomly determined the value of the spin tag.

If no further configurable symbols 600 are obtained via the three remaining spins of FIG. 6D, the configurable symbol 600 at position $\mathbf{524}_{14}$ will split. Assuming a split factor of two and each split configurable symbol retaining the numeric value of 50, the game controller 202 would present an award of 7,300 for the fourteen configurable symbols 600 displayed at the depicted seven display positions.

In various embodiments, the spin tags are assigned to all configurable symbols. In various other embodiments, certain predetermined configurable symbols only get assigned spin tags. In various other embodiments, configurable symbols are randomly selected to be assigned spin tags. The selection (random or pre-determined) may be based on wager amounts and/or wager denominations.

In various embodiments, the starting value of the spin tags are all the same. In various embodiments, the starting value of spin tags is predetermined. In various embodiments, the starting value of spin tags is randomly determined. In various embodiments, the starting value of spin tags for split symbols is based on the starting value of the spin tags of the symbol prior to the split.

In various embodiments, spin tags reset along with spin meter when an additional configurable symbol is selected and displayed in the play of the hold and spin bonus. In various embodiments, spin tags reset when an additional configurable symbol is selected and displayed in the play of the hold and spin bonus.

Various disclosed embodiments may be embodied in program code. The program code may be supplied in a number of ways, for example, on a non-transitory computer readable storage medium, such as a disc or a memory device, e.g. an EEPROM, (for example, that could replace part of memory 103). In some examples, the program code may be provided via data signals (for example, by transmitting the program code from a server). Further, different parts of the program code can be executed by different devices, for example, in a client-server relationship. Persons skilled in the art will appreciate that program code provides a series of instructions executable by a controller having, for example, via one or more processors.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming machine, comprising:
a player interface;
a display system comprising one or more display devices; and
a controller comprising one or more processors, the controller executing instructions which cause the controller to:
cause the display system to present symbols of a base game outcome at display positions on a graphical user interface (GUI), the symbols of the base game outcome including first configurable symbols and non-configurable symbols;
cause the GUI to present assigned first spin tags to each of the first configurable symbols of the base game outcome, the first spin tags including a first spin tag symbol and a first spin tag numeric value presented at the display position associated with respective first configurable symbol;
in response to the base game outcome corresponding to a trigger condition, cause the GUI to present a feature game having an initial quantity of spins;
for each spin of the feature game:
for each first configurable symbol, update the first spin tag numeric value of the first configurable symbol, the update causing the GUI to decrement or increment the first spin tag numeric value;
in response to a first spin tag numeric value of a first configurable symbol having a predetermined relationship to a threshold value, split, on the GUI, the first configurable symbol into a plurality of second configurable symbols;
cause the GUI to hold the first configurable symbols and the second configurable symbols; and
cause the GUI to provide each of the display positions that does not present at least one of the first configurable symbol or the second configurable symbol with a replacement symbol; and
in response to a conclusion of the feature game, cause the GUI to present an award based, at least in part, on a sum of prize values associated with the second configurable symbols.

2. The gaming machine of claim 1, wherein the decrementing of a respective first spin tag numeric value is by a defined amount.

3. The gaming machine of claim 2, wherein execution of the instructions causes the controller to split the first configurable symbol in response to its first spin tag numeric value reaching or passing the threshold value of zero.

4. The gaming machine of claim 1, wherein execution of the instructions causes the controller to assign a second spin tag to respective ones of the second configurable symbols.

5. The gaming machine of claim 1, wherein execution of the instructions causes the controller to randomly assign a second spin tag to respective ones of the second configurable symbols.

6. The gaming machine of claim 1, wherein:
the first configurable symbols comprise first prize values; and
execution of the instructions causes the controller to assign a respective second prize value, based on a respective one of the first prize values, to respective ones of the second configurable symbols.

7. The gaming machine of claim 1, wherein:
the first configurable symbols comprise prize values; and
execution of the instructions causes the controller to present each second configurable symbol with the prize value of a respective one of the first configurable symbols.

8. The gaming machine of claim 1, wherein execution of the instructions causes the controller to present the plurality of second configurable symbols at a single display position of the display positions.

9. The gaming machine of claim 1, wherein execution of the instructions causes the controller to reset a quantity of spins remaining in the feature game to the initial quantity of spins in response to the replacement symbols including at least one first configurable symbol.

10. A method of a gaming machine, the method comprising:
causing a display system of the gaming machine to present symbols of a base game outcome at display positions on a graphical user interface (GUI), the symbols including first configurable symbols and non-configurable symbols; causing the GUI to present assigned spin tag numeric values to each of the first configurable symbols of the base game outcome;
triggering, with a game controller of the gaming machine, a feature game to be presented on the GUI based on the first configurable symbols of the base game outcome, the feature game comprising a quantity of spins;
for each spin of the feature game:
for each first configurable symbol, updating, with the game controller, a first spin tag numeric value of the first configurable symbol, the updating causing the GUI to decrement or increment the first spin tag numeric value;
in response to the first spin tag numeric value of a first configurable symbol having a predetermined relationship to a threshold value, splitting on the GUI, with the game controller, the first configurable symbol into a plurality of second configurable symbols;
causing the GUI to hold, with the game controller, the first configurable symbols and the second configurable symbols; and
causing the GUI to provide, with the game controller, each of the display positions that does not present at least one of the first configurable symbol or the second configurable symbol with replacement symbol; and
in response to a conclusion of the feature game, causing the GUI to present, via the display system, an award based, at least in part, on a sum of values associated with the second configurable symbols.

11. The method of claim 10, wherein the updating comprises decrementing the first spin tag numeric value by a defined amount.

12. The method of claim 10, wherein the splitting of the first configurable symbol occurs in response to its first spin tag numeric value reaching or passing the threshold value of zero.

13. The method of claim 10, comprising assigning a spin tag to respective ones of the second configurable symbols in response to splitting the first configurable symbol.

14. The method of claim 10, comprising assigning a second spin tag numeric value to respective ones of the second configurable symbols based on the first spin tag numeric value of the first configurable symbol in response to splitting the first configurable symbol.

15. The method of claim 10, comprising presenting the plurality of the second configurable symbols at a single display position of the display positions in response to splitting the first configurable symbol.

16. The method of claim 10, comprising resetting a quantity of spins remaining in the feature game to an initial quantity of spins for the feature game in response to the replacement symbols including at least one first configurable symbol.

17. A non-transitory computer readable storage medium comprising instructions, which when executed, cause a gaming machine comprising a display system with one or more display devices to:

cause the display system present symbols of a base game outcome at display positions of on a graphical user interface (GUI), the symbols of the base game outcome including first configurable symbols and non-configurable symbols;

cause the GUI to present assigned first spin tags to each of the first configurable symbols of the base game outcome, the first spin tags including a first spin tag symbol and a first spin tag numeric value presented at the display position associated with the respective first configurable symbol;

in response to the base game outcome corresponding to a trigger condition, cause the GUI to present a feature game having an initial quantity of spins;

for each spin of the feature game:

for each first configurable symbol, update the first spin tag numeric values of the first configurable symbol, the update causing the GUI to decrement or increment the first spin tag numeric value;

in response to the first spin tag numeric value of a first configurable symbol having a predetermined relationship to a threshold value, split the first configurable symbol into a plurality of second configurable symbols;

causing the GUI to hold the first configurable symbols and the second configurable symbols; and causing the GUI to provide each of the display positions that does not present at least one of the first configurable symbol or the second configurable symbol with a replacement symbol; and in response to a conclusion of the feature game, cause the GUI to present an award based, at least in part, on a sum of values associated with the second configurable symbols.

18. The non-transitory computer readable storage medium of claim 17, wherein the decrementing of a respective first spin tag numeric value is by a defined amount.

19. The non-transitory computer readable storage medium of claim 17, wherein the instructions, when executed, cause the gaming machine to split the first configurable symbol in response to its first spin tag numeric value reaching or passing the threshold value of zero.

20. The non-transitory computer readable storage medium of claim 17, wherein the instructions, when executed, cause the gaming machine to assign a second spin tag to respective ones of the second configurable symbols.

* * * * *